United States Patent Office 2,857,308
Patented Oct. 21, 1958

2,857,308

METHOD OF DESTROYING NEMATODES EMPLOYING PHOSPHORODITHIOATES

Joseph W. Baker, Nitro, W. Va., assignor to Monsanto Chemical Company, St. Louis, Mo., a corporation of Delaware No Drawing. Application November 15, 1956
Serial No. 622,254

10 Claims. (Cl. 167—30)

This invention relates to compositions useful in the treatment of soil, particularly to compositions useful in destroying parasitic worms present in the soil, and to a method of applying the same. It further relates to the destruction of the parasitic worms known as nematodes in any of the egg, larvae and adult stages of their life cycles and particularly those harmful worms which attack crop plants and cause considerable damage thereto.

The problem of controlling harmful and unwanted parasites present in the soil, such as nematodes, is one of considerable complexity. In order to be an effective toxicant, a compound must be able to penetrate the normally impervious outer covering of the worm as well as the enclosing membranes of the larvae and eggs and to interfere with some vital function of the organism. While the exact mechanism of destroying the soil worm life is not fully understood, it is believed that the effective toxicants destroy or reduce to a low level the effectiveness of vital enzymes. A compound which is effective must be one that will remain in the soil in contact with the undesirable worm life for a sufficient period of time to effect the penetration of the worm and to destroy it by one means or another. To accomplish this result, it is necessary that the toxicant resist the destructive action of soil bacteria, be capable of wetting or penetrating the parasite, possess a substantial water dispersibility, be capable of ready mixture with the soil and possess a sufficiently low vapor pressure so that it does not evaporate before its destructive action is accomplished. Since the exacting requirements of any practical agent cannot be recognized by methods other than by test, it is necessary to observe the effectiveness of chosen compounds against the life cycle of the parasite.

In accordance with the present invention it has been discovered that O,O-di(halophenyl)phosphorodithioates are highly effective for controlling soil infesting organisms and particularly nematodes. The S-hydrogen phosphorodithioates as well as a variety of salts and esters fall within the scope of the invention.

The compounds found to be especially effective for the intended purpose conform to the structure

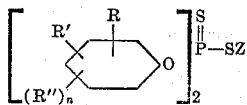

where R represents a halogen substituent preferably chlorine or bromine, R' is preferably another halogen but may be hydrogen, lower alkyl or phenyl, R" is preferably hydrogen but may be halogen and n is an integer less than four. Z represents hydrogen, a metal salt forming group, ammonium, alkyl, di(loweralkyl)aminoethyl or N,N-di(loweralkyl)aniline salt forming groups.

Many of the O,O-di(halophenyl)phosphorodithioates suitable for the practice of this invention and methods for their preparation are known. Usually the products prepared by condensing four molecular proportions of a halophenol and one molecular proportion of $P_2S_5$ are satisfactory for use without further purification. The products form in essentially quantitative yield by heating the reactants at 140–150° C. for 1–3 hours. For example, 789.8 parts by weight of 2,4,5-trichlorophenol was melted and to the molten phenol 222.3 parts by weight of $P_2S_5$ was added. The temperature was raised to 140° C. at which point the heat of reaction carried the temperature to 155° C. The mixture was cooled to 145° C. and heated at 140–148° C. for 1.5 hours. The product was a light yellow liquid. The neutralization number, phosphorus and sulfur analyses compared to that calculated for O,O-bis-(2,4,5-trichlorophenyl) S-hydrogen phosphorodithioate were as follows:

|  | Calculated | Found |
|---|---|---|
| N. N. | 115 | 116.5 |
| Phosphorus_____percent__ | 6.3 | 6.4 |
| Sulfur_____do____ | 13.1 | 13.3 |

Other examples obtainable in similar manner comprise O,O-bis(2,4-dichlorophenyl) S-hydrogen phosphorodithioate, a yellow liquid; O,O-bis(p-chlorophenyl) S-hydrogen phosphorodithioate, a light yellow liquid; O,O-bis(2,4,6-trichlorophenyl) S-hydrogen phosphorodithioate, a sticky solid; O,O-bis(o-chlorophenyl) S-hydrogen phosphorodithioate, a yellow liquid; O,O-bis(2,4-dibromophenyl) S-hydrogen phosphorodithioate, a grey solid; O,O-bis(p-bromophenyl) S-hydrogen phosphorodithioate, a viscous amber liquid; O,O-bis(m-chlorophenyl) S-hydrogen phosphorodithioate, a yellow liquid; O,O-bis(2-chloro-p-biphenylyl) S-hydrogen phosphorodithioate, a viscous amber liquid and O,O-bis(4-chloro-3-methylphenyl) S-hydrogen phosphorodithioate, a yellow solid.

Occasionally it is necessary to filter off a small amount of unreacted $P_2S_5$. Reaction with 2,4,6-trichlorophenol is rather sluggish and required 3 hours heating at 140–150° C. Reaction with 2,4-dibromophenol is also rather sluggish but p-bromophenol reacts rapidly at 125° C. and 30 minutes heating at 120–130° C. is sufficient. The products are insoluble in water but soluble in common organic solvents.

The reaction of pentachlorophenol with $P_2S_5$ is less definite than reaction of lower chlorinated phenols and the composite reaction products are less effective nematode toxicants than products from di- and trichlorophenols. After refluxing four molecular proportions of pentachlorophenol and one molecular proportion of $P_2S_5$ in xylene for 7 hours at 144–150° C., the reaction mixture deposited a solid product upon cooling. Both this and the material remaining in the mother liquor were found to be toxic to nematodes.

Metal and ammonium salts of the acids exert comparable activity and may be prepared by the usual methods. Zinc O,O - bis(2,4 - dichlorophenyl) phosphorodithioate was prepared by adding 50 parts of zinc dust to 600 parts of the thio acid at 90° C., heating for 4 hours, then stripping in vacuo at 90° C. 10 mm./Hg and filtering the residue through a layer of clay. The sodium salt was prepared by condensing sodium methylate (10.3 parts) and bis 2,4-dichlorophenyl S-hydrogen phosphorodithioate (84.0 parts) in benzene. The reaction was slightly exothermic and the solid product precipitated from solution. The ammonium salt resulted from passing $NH_3$ gas into a benzene solution of the thio acid at 25–30° C. The salt precipitated from solution and was readily isolated. Monoamine salts usually have little activity but the N,N-dilower alkyl aniline salts are exceptional. The salts form readily by mixing the amine and thio acid and heating gently. They are dark viscous liquids.

The esters may be prepared by heating a halide of the desired ester constituent with the thio acid in the presence of an esterification catalyst. O,O-bis(2,4-dichlorophenyl) S-dodecyl phosphorodithioate was produced in quantitative yield by refluxing 63 parts by weight of O,O-bis(2,4-dichlorophenyl) S-hydrogen phosphorodithioate, 65.8 parts by weight of 19.4% sodium ethylate and 46.5 parts by weight of 1-bromododecane for 4 hours. The product was isolated by distilling off the solvent, quenching the residue in water, redissolving in a water immiscible solvent, washing the solution with sodium bicarbonate solution and again removing the solvent. The product was a brown viscous liquid.

As specific embodiments of the invention, nematocidal activity was demonstrated by preparing a suspension of the nematode *Panagrellus redivivus* in water and observing through a microscope the motility of the organisms in the presence of 0.1% of the test material. The nematode in aqueous suspension will flex its body at a regular rate and as the nematocide takes effect, the rate of flexing is decreased until death of the parasite occurs. In this experiment the control containing no added toxicant showed undiminished activity after 24 hours whereas complete destruction of the nematode was effected with the following:

Compound No. 1.[1]—O,O-bis(2,4-dichlorophenyl) S-hydrogen phosphorodithioate
Compound No. 2.[1]—O,O-bis(2,4,5-trichlorophenyl) S-hydrogen phosphorodithioate
Compound No. 3.[1]—O,O-bis(p-chloropheny) S-hydrogen phosphorodithioate
Compound No. 4.[1]—O,O-bis(2,4-dichlorophenyl) S-dodecyl phosphorodithioate
Compound No. 5.—Zinc O,O-bis(2,4-dichlorophenyl) phosphorodithioate
Compound No. 6.—Ammonium O,O-bis(2,4-dichlorophenyl) phosphorodithioate
Compound No. 7.—O,O-bis(2,4-dichlorophenyl) S-(2-diethylaminoethyl) phosphorodithioate
Compound No. 8.—N,N-dimethylaniline salt with O,O-bis(2,4,5-trichlorophenyl) S-hydrogen phosphorodithioate
Compound No. 9.—O,O-bis(2,4,6-trichlorophenyl) S-hydrogen phosphorodithioate
Compound No. 10.—O,O-bis(o-chlorophenyl) S-hydrogen phosphorodithioate
Compound No. 11.—O,O-bis(2,4-dibromophenyl) S-hydrogen phosphorodithioate
Compound No. 12.—O,O-bis(p-bromophenyl) S-hydrogen phosphorodithioate
Compound No. 13.—O,O-bis(m-chlorophenyl) S-hydrogen phosphorodithioate
Compound No. 14.—Condensation product of $P_2S_5$ and pentachlorophenol
Compound No. 15.—O,O-bis(4-chloro-3-methylphenyl) S-hydrogen phosphorodithioate
Compound No. 16.—O,O-bis(2-chloro-p-biphenylyl) S-hydrogen phosphorodithioate
Compound No. 17.—O,O-bis(2,4-dichlorophenyl) S-sodium phosphorodithioate.

In another experiment sterilized soil was infested with nematodes (Meloidogyne sp.) and different portions treated with solutions containing the test materials. After standing for a week, two-week old tomato plants were transplanted in the test soil and also in untreated, heat-sterilized soil. The plants were allowed to grow for two months, then were harvested. The roots washed and examined for evidence of infection. Comparison to the untreated controls gave the phytotoxicity of the compounds. For convenience in recording the index of infection and phytotoxicity in the table below, the following rating keys were used:

| Infestation | Phytotoxicity |
|---|---|
| 1. No infection. | 0. No evidence of phytotoxicity. |
| 2. Infection, barely recognized. | 1. Slight toxicity. |
| 3. Light infection. | 2. Moderate toxicity. |
| 4. Medium infection. | 3. Severely toxic. |
| 5. Heavy infection. | 4. No plant survival. |

*Table 1*

| Compound No. | Concentration | Infestation | Phytotoxicity |
|---|---|---|---|
| | *Percent* | *Percent* | *Percent* |
| 1 | 0.1 | 1 | 2 |
| 2 | 0.01 | 2 | 1.5 |
| 3 | 0.1 | 1 | 1 |
| 4 | 0.01 | 2 | 2 |
| 5 | 0.1 | 1 | 2 |
| 6 | 0.01 | 2.5 | 1 |
| 7 | 0.01 | 1 | 1 |

In actual usage any of the compounds within the preferred class described may be added to the soil in solution, as an emulsion or water dispersion but preferably is added in a solid formulation wherein the active nematocide is distributed over some dry and permanently free-flowing powder such as the clays, including bentonite and Attapulgite or such materials as talc, diatomaceous earth, fuller's earth, chalk, calcium carbonate and the like. These diluents possess the added advantage of lower cost treatment since normally they comprise more than 50% up to 98% of the complete formulation and thereby provide a means of more even distribution of the active material over a wider area and in the effective quantities required. These nematocidal compositions will of course attack the soil phase of the life cycle of nematode parasites which infest animals. Treating barnyards, chicken pens, stables and other infested areas destroys eggs and infective larvae of many parasites which infest animals. Moreover, the compositions are effective for the control of nematodes in their environment which includes bodies of animals. They are toxic to other worms such as flukes and tapeworms.

In the use of O,O-di(halophenyl) phosphorodithioates as nematocides or soil fumigants the active compound, diluted or undiluted, may be applied to the soil at rates of 10 to 500 pounds per acre. The preferred application for treating soils of average nematode infestation will be from 25 to 100 pounds per acre. The formulation may contain dispersants which aid uniform distribution.

It is intended to cover all changes and modifications of the examples of the invention herein chosen for purposes of disclosure which do not constitute departures from the spirit and scope of the invention.

What is claimed is:

1. The method of destroying parasitic worm life in agricultural soils infested with nematodes which comprises contacting the said organisms with a toxic concentration of a compound of the structure

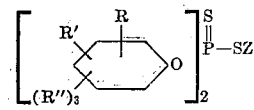

R, R' and (R'')₃ representing the 5 substituents on the carbon of a phenyl radical, where R is selected from the group consisting of chlorine and bromine, R' is selected from the group consisting of chlorine, bromine, hydrogen, lower alkyl, phenyl, R'' is selected from the group consisting of chlorine, bromine, hydrogen and combinations thereof, and Z is selected from a group consisting of hydrogen, ammonium, metal salt forming groups, N,N-di loweralkyl aniline salt forming groups, alkyl and di loweralkylaminoethyl.

---
[1] Instantaneous kill.

2. The method of destroying parasitic worm life in agricultural soils infested with nematodes which comprises contacting the said organisms with a toxic concentration of a compound of the structure

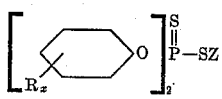

where R is halogen, $x$ is an integer from 1 to 3 inclusive, and Z is an alkyl radical.

3. The method of destroying parasitic worm life in agricultural soils infested with nematodes which comprises contacting the said organisms with a toxic concentration of a compound of the structure

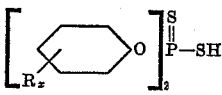

where R is halogen and $x$ is an integer from 1 to 3 inclusive.

4. The method of destroying parasitic worm life in agricultural soils infested with nematodes which comprises contacting the said organisms with a toxic concentration of a compound of the structure

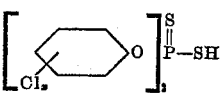

where $x$ is an integer from 1 to 3 inclusive.

5. The method of destroying parasitic worm life in agricultural soils infested with nematodes which comprises contacting the said organisms with a toxic concentration of a compound of the structure

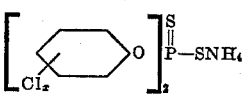

where $x$ is an integer from 1 to 3 inclusive.

6. The method of destroying parasitic worm life in agricultural soils infested with nematodes which comprises contacting the said organisms with a toxic concentration of a compound of the structure

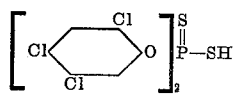

7. The method of destroying parasitic worm life in agricultural soils infested with nematodes which comprises contacting the said organisms with a toxic concentration of a compound of the structure

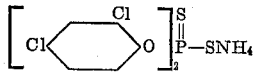

8. The method of destroying parasitic worm life in agricultural soils infested with nematodes which comprises contacting the said organisms with a toxic concentration of a compound of the structure

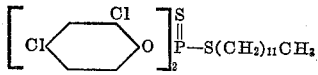

9. The method of destroying parasitic worm life in agricultural soils infested with nematodes which comprises contacting the said organisms with a toxic concentration of a compound of the structure

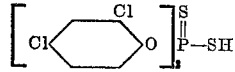

10. The method of destroying parasitic worm life in agricultural soils infested with nematodes which comprises contacting the said organisms with a toxic concentration of a compound of the structure

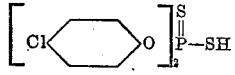

References Cited in the file of this patent

UNITED STATES PATENTS

| | | |
|---|---|---|
| 1,939,951 | Buchanan | Dec. 19, 1933 |
| 2,761,806 | Boyer | Sept. 4, 1956 |

FOREIGN PATENTS

| | | |
|---|---|---|
| 1,059,358 | France | Mar. 24, 1954 |
| 655,875 | Great Britain | Aug. 8, 1951 |